Oct. 27, 1925.
C. F. JENKINS
1,559,437
DOUBLE IMAGE RADIO PICTURE
Filed May 5, 1925
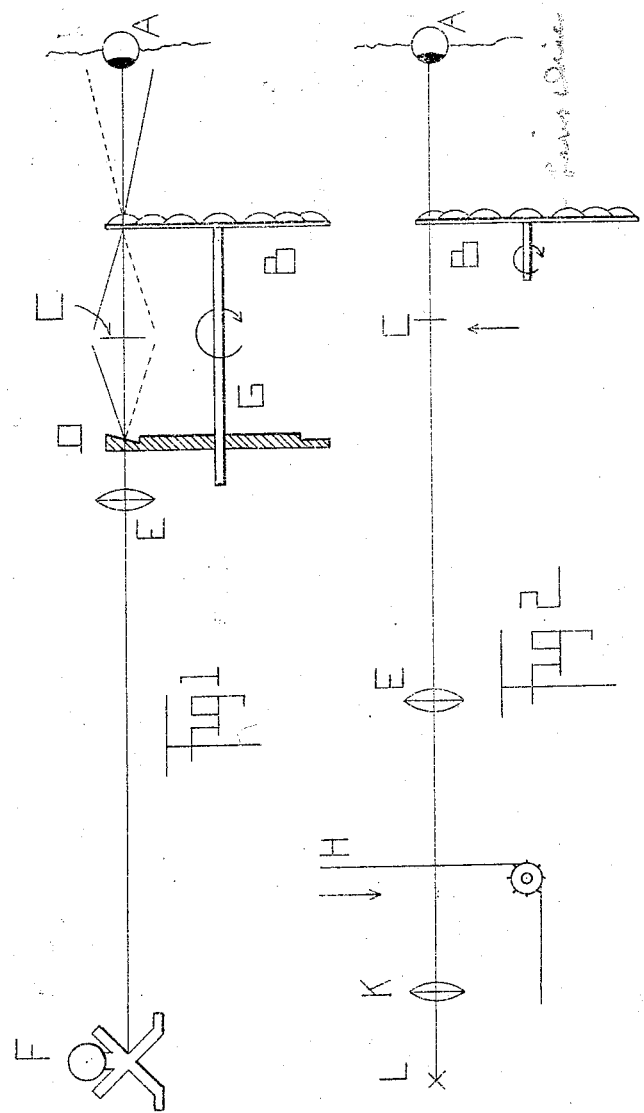
Inventor
C. Francis Jenkins
By Florence M. Anthony
Attorney Patented Oct. 27, 1925.

1,559,437

UNITED STATES PATENT OFFICE.

CHARLES FRANCIS JENKINS, OF WASHINGTON, DISTRICT OF COLUMBIA.

DOUBLE-IMAGE RADIO PICTURE.

Application filed May 5, 1925. Serial No. 28,223.

*To all whom it may concern:*

Be it known that I, CHARLES FRANCIS JENKINS, citizen of the United States, residing at Washington, District of Columbia, have invented certain new and useful Improvements in Double-Image Radio Pictures, of which the following is a specification.

This invention relates to apparatus for radio vision and radio movies, and has for its principal object mechanism which will be continuous in motion and quiet in operation, and capable of the necessary high speed to come within the period of persistence of vision, i. e., standard motion picture speed of sixteen picture frames per second.

As is now well known, the generally accepted method of transmitting pictures electrically by radio or by wire, is to analyze the picture in lines by sweeping it across a light sensitive cell thousands of times per second to convert the light values of the picture into electric current values; and at the receiving station to synthesize the picture in a like-number of lines.

For this reason the usual method of moving motion picture film intermittently across the source of illumination is not the best method, for the reason that, in this point-line method of analysis the eye does not see the whole picture, as it does in theatre picture projection, but sees only a single point of light at any one time, and, therefore, there should be the least possible dark-time interval, as the point of light, moving in adjacent lines makes up the picture with almost incredible swiftness.

Continuous motion of the film across the light is by far the most successful method, and means to this end are employed in the apparatus the subject of this application.

With this and other objects in view the invention consists in the novel details of assembly of the various elements employed, hereinafter disclosed, and particularly pointed out in the claims.

In the drawings Fig. 1 is a schematic drawing of the apparatus employed when sending from a living subject, and Fig. 2 a drawing of the apparatus employed when sending from a motion picture film.

In both the figures like symbols refer to like parts, in which A is a light-sensitive cell; B a lens-disc; C a ground-glass screen; D a prismatic disc (Patent No. 1,385,325); E an objective lens; F an animated figure; and G a shaft upon which both the prism and lens-carrier are mounted. H is a motion picture film; K a condenser lens; and L a source of illumination.

In operation the figure F would be focused by the lens E on the ground-glass C, except for the interception of prism D which deflects the image to the top of the ground-glass C. From this point the lenses of lens-disc B focus the first image at a point below the light-sensitive cell A.

The rotation of the prismatic ring D causes the image of the figure F to sweep across the ground-glass from top to bottom.

At the same time the lenses of lens disc B each in turn sweep the second image, i. e., the image of the first image, across the light cell in a horizontal direction. As there are many lenses there will be many trips of the image across the cell during a single rotation of the prism disc. The combined movement produces the usual lined analysis of the picture, and the picture sweeping across the cell changes the light values of the picture into electric values in the well-known manner.

In Fig. 2 the picture frames on the film H are focused by lens E onto the ground-glass C, being illuminated by the light-source L.

The film in motion gives the necessary travel across the ground-glass C, while the lens-disc in rotation again gives the lateral analytical movement.

In both figures, in order to get the greatest amount of light on the cell, the ground-glass C is removed as soon as the lens E and the lenses on the lens disc B are properly focused. This, of course, gives only aerial images, but such images give more than twice the light attainable when the ground glass remains in position.

What I claim, is—

1. The combination of means for forming an image of an object, means for giving linear movement to said image, means for forming an image of said first image, means for giving linear movement to said second image a plurality of times and at approximately right angles to the movement of said first image, and a light sensitive cell located to be swept by said second image.

2. The combination of means for forming an aerial image of an object, means for giving linear movement to said image, means for forming an aerial image of said first image, and means for giving linear movement to said second image a plurality of times and in a direction approximately at right angles to the movement of said first image.

3. The combination of means for forming an image of an object, means for giving linear movement to said image, means for forming an image of said first image, and means for giving linear movement to said second image a plurality of times, and in a direction approximately at right angles to the movement of said first image.

4. The combination of means for forming an image of an object, means for giving movement to said image, means for forming an image of said first image, and means for giving movement to said second image in a direction approximately at right angles to the movement of said said first image.

5. The combination of a motion picture film, means for moving said film longitudinally, means for forming an image of the picture frames on said film, means for forming an image of said first image, and means for giving linear movement to said second image a plurality of times and at right angles to the movement of said film.

6. The combination of a motion picture film, means for moving said film longitudinally, means for forming an image of the picture frames on said film, means for forming an image of said first image, and means for giving linear movement to said second image a plurality of times and approximately at right angles to the movement of said film, and a light-sensitive cell located to be swept by second image.

7. The combination of a motion picture film, means for giving longitudinal movement to said film, a lens for imaging the picture frame on said film, a rotating carrier having a plurality of lenses thereon each of which in succession move across the optical axis of said first lens.

8. The combination of an image-forming element, a prismatic ring located in the optical axis of said element, and a rotatable disc carrying a plurality of image forming elements thereon, each of which in succession moves across the optical axis of said first image forming element.

9. The combination of an image-forming lens, a rotatable prismatic ring located in the optical axis of said lens, a rotatable carrier having a plurality of lenses therein each of which in succession moves across the optical axis of said first lens, and means for rotating the prism ring and the lens carrier in synchronism.

In testimony whereof I have affixed my signature.

CHARLES FRANCIS JENKINS.